(12) United States Patent
Schneider et al.

(10) Patent No.: US 6,667,438 B2
(45) Date of Patent: Dec. 23, 2003

(54) PADMOUNT TRANSFORMER ENCLOSURE

(75) Inventors: Jeffrey A. Schneider, Dyersburg, TN (US); Rad J. Hunsley, Dyersburg, TN (US); Greg V. Campbell, Troy, TN (US)

(73) Assignee: Ermco, Dyersburg, TN (US)

( * ) Notice: Subject to any disclaimer, the term of this patent is extended or adjusted under 35 U.S.C. 154(b) by 0 days.

(21) Appl. No.: 10/007,009

(22) Filed: Dec. 5, 2001

(65) Prior Publication Data

US 2003/0102141 A1 Jun. 5, 2003

(51) Int. Cl.$^7$ ................................................. H05K 5/00
(52) U.S. Cl. .................. 174/50; 211/119.004; 160/118; 16/221; 16/235; 16/DIG. 29; 402/26; 49/381; 256/26
(58) Field of Search ...................... 174/50; 211/119.004; 160/118; 16/221, 235, DIG. 29; 402/26; 49/381; 256/26

(56) References Cited

U.S. PATENT DOCUMENTS

| | | | |
|---|---|---|---|
| 3,014,158 A | * 12/1961 | Nelson et al. | 174/16.1 |
| 3,376,086 A | 4/1968 | Fisher | 312/100 |
| 3,548,704 A | 12/1970 | Kutryk | 85/86 |
| 3,631,757 A | 1/1972 | Parkin | 85/36 |
| 3,657,503 A | 4/1972 | Smith | 200/155 R |
| 3,709,401 A | 1/1973 | Walstrom | 220/55 |
| 3,784,727 A | * 1/1974 | Haubein | 174/50 |
| 3,870,932 A | * 3/1975 | Broverman | 361/268 |
| 3,921,687 A | 11/1975 | Stencel | 151/41.73 |
| 3,944,718 A | 3/1976 | Bright | 174/50 |
| 4,003,610 A | 1/1977 | Main | 312/100 |
| 4,005,253 A | 1/1977 | Walter | 174/37 |
| 4,102,475 A | * 7/1978 | Kalvaitis | 220/3.8 |
| 4,152,910 A | 5/1979 | Swisher | 70/159 |
| 4,296,791 A | * 10/1981 | Chaumat et al. | 160/206 |
| 4,466,676 A | 8/1984 | Nilsson | 312/283 |
| 4,530,443 A | 7/1985 | Gorges | 220/327 |
| 4,533,786 A | * 8/1985 | Borgmeyer et al. | 174/50 |
| 4,559,699 A | 12/1985 | Owen et al. | 29/602 |
| 4,727,900 A | 3/1988 | Dooling et al. | 137/296 |
| 4,834,257 A | * 5/1989 | Book et al. | 165/104.33 |
| 4,880,344 A | 11/1989 | Henry et al. | 411/374 |
| 4,901,182 A | * 2/1990 | Book | 336/105 |
| 4,963,696 A | 10/1990 | Owen et al. | 174/50 |
| 4,986,096 A | 1/1991 | Soehner et al. | 70/54 |
| 5,078,437 A | 1/1992 | Borgmeyer et al. | 292/206 |
| 5,189,257 A | 2/1993 | Borgmeyer et al. | 174/50 |
| 5,469,724 A | 11/1995 | Pollard | 70/178 |
| 5,534,664 A | 7/1996 | Fearing, Jr. et al. | 174/50 |
| 5,573,319 A | * 11/1996 | Dirk | 174/52.1 |
| 5,739,464 A | 4/1998 | Adkins et al. | 174/50 |
| 5,783,775 A | 7/1998 | Marusinec | 174/50 |
| 5,823,646 A | 10/1998 | Arizpe et al. | 312/324 |
| 5,889,231 A | 3/1999 | Marusinec et al. | 174/50 |
| 5,904,383 A | 5/1999 | van der Wal | 292/307 |
| 5,988,966 A | 11/1999 | Chen et al. | 411/372 |
| 6,066,802 A | * 5/2000 | Reinke et al. | 174/50 |
| 6,106,035 A | 8/2000 | Hetherington | 292/251 |

* cited by examiner

*Primary Examiner*—Dean A. Reichard
*Assistant Examiner*—Anton Harris
(74) *Attorney, Agent, or Firm*—Walker, McKenzie & Walker, P.C.

(57) ABSTRACT

A pad-mounted transformer enclosure may have a wiring compartment utilizing multiple hinge points on each side panel with an additional set of hinges located at the back of the compartment area to allow the doors to be opened as normal or to allow the sides to be also opened, allowing the wiring compartment to be totally exposed on all three sides. The tank of the transformer enclosure may have a cover secured in a manner that allows the cover to be removed with simple hand tools while preventing unauthorized removal thereof, that increases tank top structural rigidity, and that does not trap water on the tank cover.

15 Claims, 5 Drawing Sheets

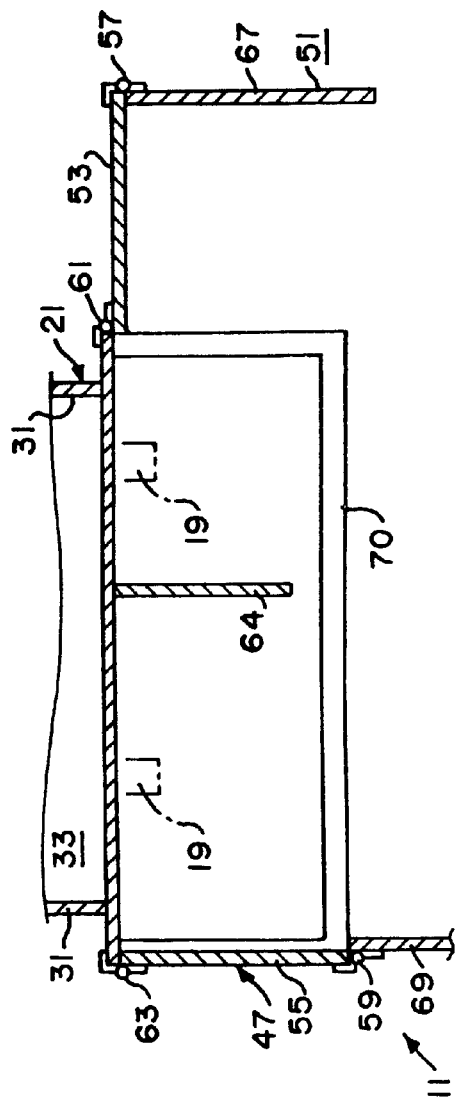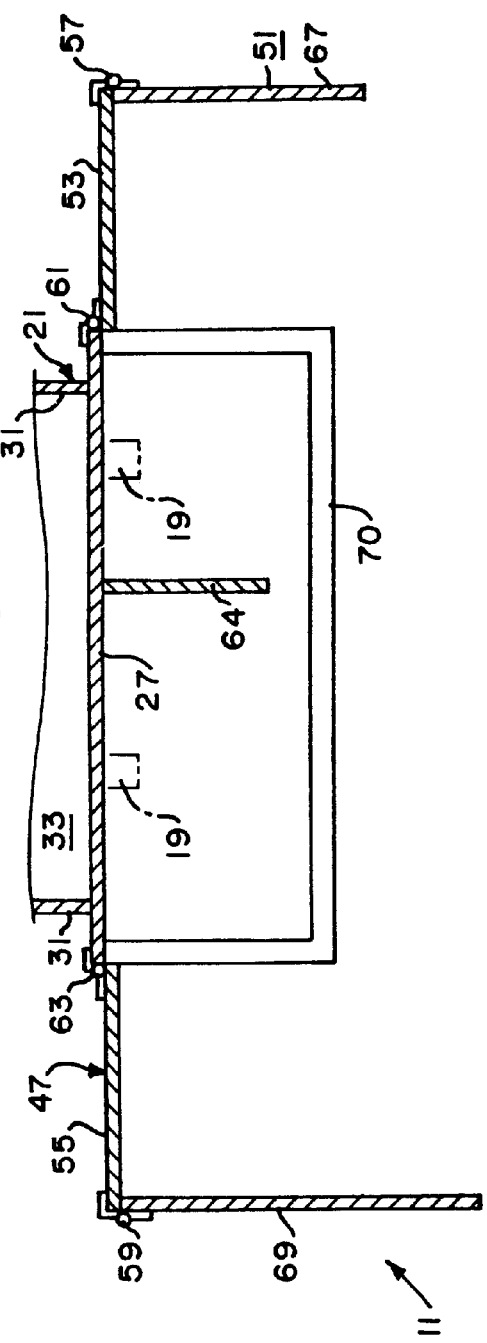

PADMOUNT TRANSFORMER ENCLOSURE

BACKGROUND OF THE INVENTION

1. Field of the Invention

The present invention relates, in general, to transformers, and in particular, to an improved padmount transformer enclosure.

2. Information Disclosure Statement

A preliminary patentability search in Class 174, subclass 50, and Class 312, subclasses 223.1 and 100, produced the following patents, which appear to be relevant to the present invention: Nelson et al., U.S. Pat. No. 3,014,158, issued Dec. 19, 1961; Fisher, U.S. Pat. No. 3,376,086, issued Apr. 2, 1968; Main, U.S. Pat. No. 4,003,610, issued Jan. 18, 1977; Nilsson, U.S. Pat. No. 4,466,676, issued Aug. 21, 1984; Borgmeyer et al., U.S. Pat. No. 5,189,257, issued Feb. 23, 1993; Dirk, U.S. Pat. No. 5,573,319, issued Nov. 12, 1996; Marusinec, U.S. Pat. No. 5,783,775; Arizpe et al., U.S. Pat. No. 5,823,646; Marusinec et al., U.S. Pat. No. 5,889,231, issued Mar. 30, 1999; and Reinke et al., U.S. Pat. No. 6,066,802, issued May 23, 2000.

Padmount transformer enclosures are used in electrical power distribution systems to contain distribution transformers used to step down voltage from the high voltage terminal of an underground electrical distribution systems to the low voltage terminal thereof going to the end user's electrical system, etc. A typical prior art padmount transformer enclosure includes a tank for holding the core/coil assembly of the transformer immersed in oil or the like, and a wiring cabinet having high and low voltage wiring compartments for enclosing the high and low voltage bushings, respectively, of the transformer, etc. In order to prevent unauthorized access to the core/coil assembly of the transformer held within the tank of the padmount transformer enclosure, the most common prior art practice is to weld a cover over the top of the tank. Other prior art tank covers are secured with carriage bolt-nut assemblies, and include some means for shield the nuts, etc. Such shielding means result in a cover that protrudes past the top of the tank cover by several inches and causes water, etc., to be trapped along the edge of the cover. The wiring cabinet of a typical prior art padmount transformer enclosure includes left and right sidewalls, and left and right lockable doors that swing open, exposing the high and low voltage wiring compartment. One of the doors swings out to the right and the other door swings out to the left, leaving the front completely open, but the right and left sidewalls remain fixed in place.

Nothing in the known prior art discloses or suggests the present invention. More specifically, nothing in the known prior art discloses or suggests a padmount transformer enclosure that allows the doors and the side walls of the wiring compartment to be opened so that the wiring compartment is totally exposed on all three sides; or a padmount transformer enclosure including a liquid tight tank having a cover that can be removed with simple hand tools without requiring removal or disassembly of the wiring compartment, and having a tamperguard which prevents removal of the cover except by authorized personnel.

BRIEF SUMMARY OF THE INVENTION

The present invention provides an improved padmount transformer enclosure for a 3-phase padmount distribution transformer or the like. One basic concept of the present invention is to provide the terminal or wiring compartment of a padmount transformer enclosure with left and right side panels that are hinged to the transformer tank front panel so that the side panels of the wiring compartment can swing open to allow the wiring compartment to be totally exposed or open on all three sides. Another basic concept of the present invention is to provide the transformer tank of a padmount transformer enclosure with a tamper proof cover that can be removed with simple hand tools by authorized personnel.

One object of the present invention to provide a padmounted, distribution transformer enclosure with a tank cover that can be removed by the manufacturer or end user with simple hand tools, more easily than prior art tank covers.

Another object of the present invention is to provide such a transformer enclosure with a tamperguard which requires access to the interior of a lockable wiring compartment for removal of the tank cover, with the tamperguard positioned in a box section or channel in the tank beneath the cover which strengthens the tank and allows for a unique, recessed tamperguard located under the cover rather than covering the top edge of the cover, so that there is no tendency to trap water along the edge of the cover.

Another object of the present invention is to provide a padmounted, distribution transformer enclosure with a wiring compartment that can be swung open to be totally exposed on all three sides, allowing work to be done within the wiring compartment without any obstructions caused by the cabinet.

BRIEF DESCRIPTION OF THE SEVERAL VIEWS OF THE DRAWINGS

FIG. 5 is a somewhat diagrammatic sectional view of a portion of the padmount transformer enclosure of the present invention, similar to FIG. 3 but showing the first and second door panels, and the first side panel of the wiring compartment thereof in opened positions.

FIG. 6 is a somewhat diagrammatic sectional view of a portion of the padmount transformer enclosure of the present invention, similar to FIG. 3 but showing the first and second door panels and the first and second side panels of the wiring compartment thereof in opened positions.

DETAILED DESCRIPTION OF THE INVENTION

Figure 1:
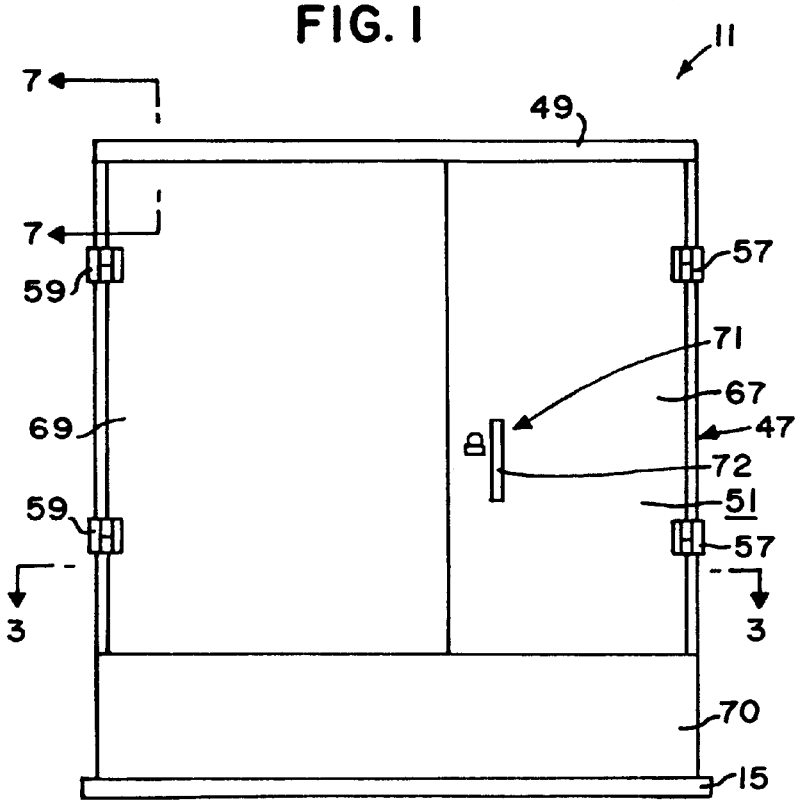
FIG. 1 is a somewhat diagrammatic front elevational view of the padmount transformer enclosure of the present invention.
Figure 2:
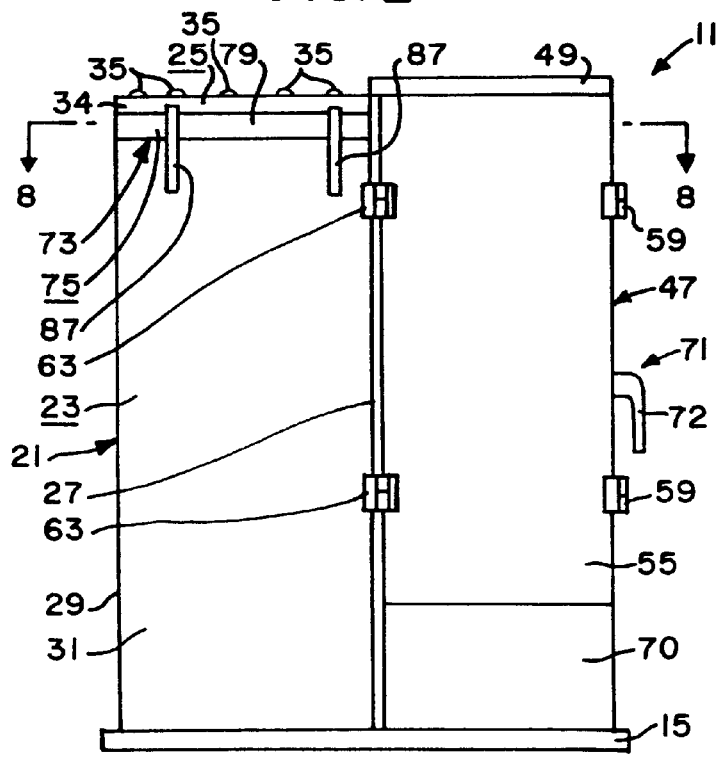
FIG. 2 is a somewhat diagrammatic left side elevational view of the padmount transformer enclosure of the present invention.
Figure 3:
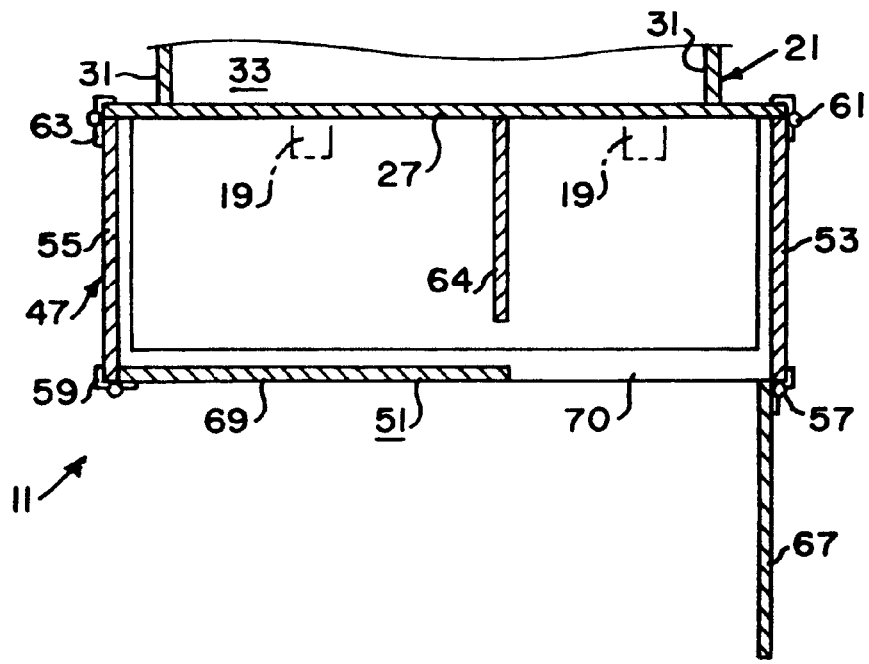
FIG. 3 is a somewhat diagrammatic sectional view of a portion of the padmount transformer enclosure of the present invention, as taken on line 3—3 of FIG. 1, showing the first door panel of the wiring compartment thereof in an opened position.
Figure 4:
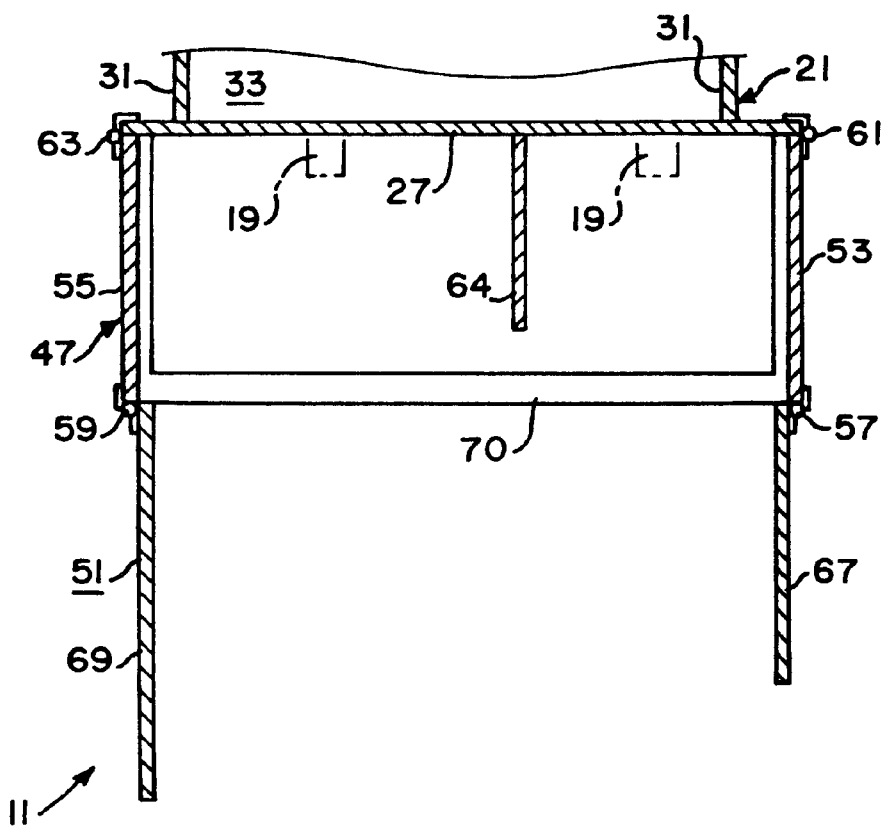
FIG. 4 is a somewhat diagrammatic sectional view of a portion of the padmount transformer enclosure of the present invention, similar to FIG. 3 but showing the first and second door panels of the wiring compartment thereof in opened positions.
Figure 7:
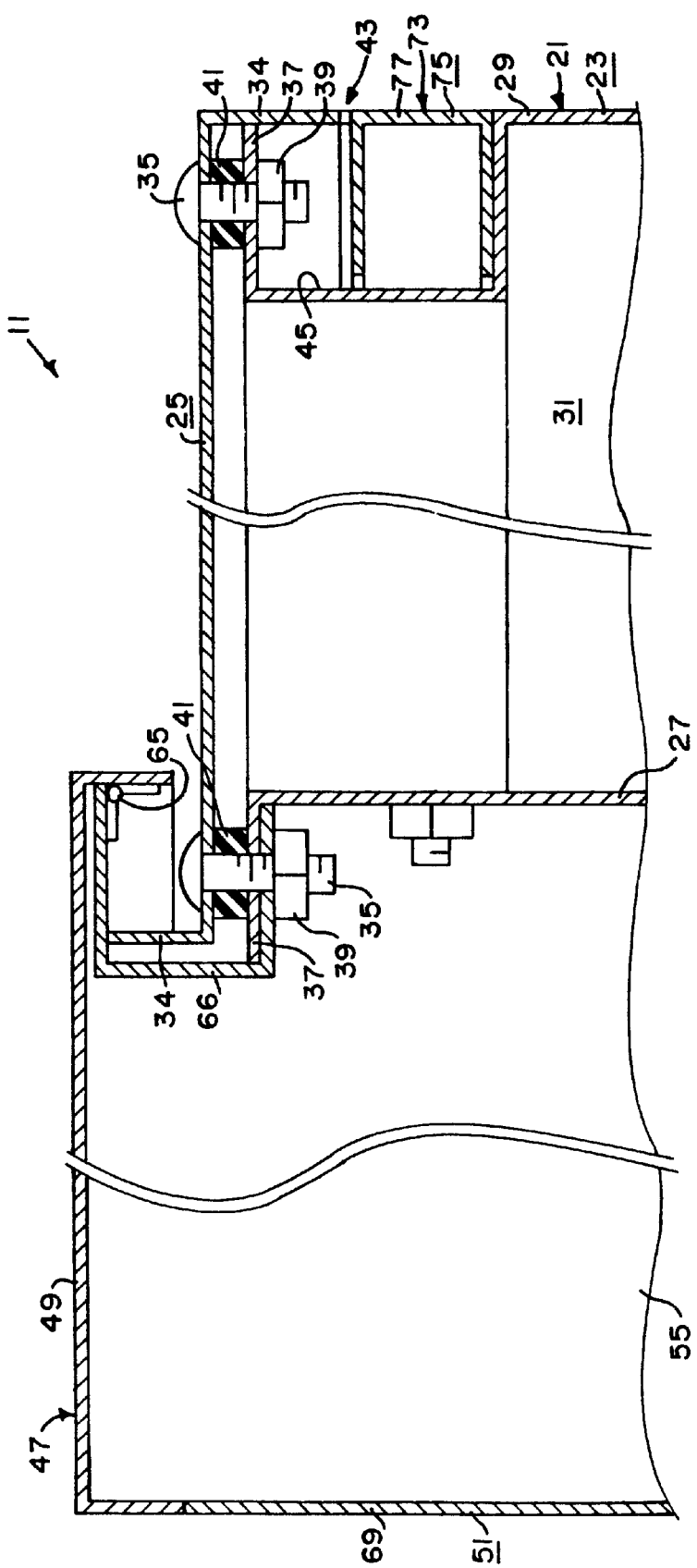
FIG. 7 is a somewhat diagrammatic sectional view of a portion of the padmount transformer enclosure of the present invention, as taken on line 7—7 of FIG. 1, with portions thereof omitted or broken away for clarity.
Figure 8:
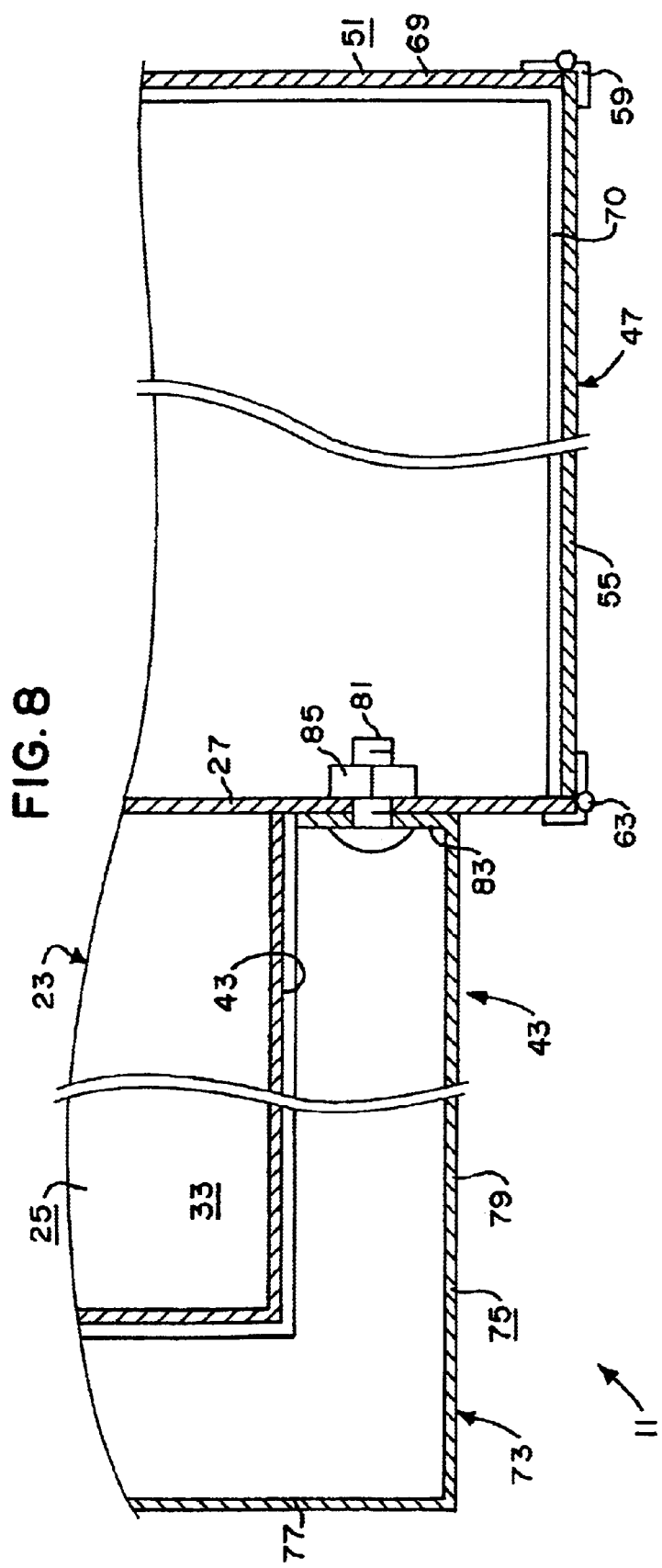
FIG. 8 is a somewhat diagrammatic sectional view of a portion of the padmount transformer enclosure of the present invention, as taken on line 8—8 of FIG. 2, with portions thereof omitted or broken away for clarity.

A preferred embodiment of the padmount transformer enclosure of the present invention is shown in FIGS. 1–8, and identified by the numeral 11. The cabinet 11 is designed to safely house a standard three-phase electrical distribution transformer or the like mounted on a ground level platform or pad 15, etc. Such a transformer is commonly used to step down voltage from the high voltage terminal of an underground electrical distribution systems to the low voltage terminal thereof, and includes a core/coil assembly, and electrical connectors 19 such as high voltage bushings and low voltage bushings, or other conventional couplings, to allow electrical connection between the core/coil assembly, and the high and low voltage terminals, etc.

The cabinet 11 includes a transformer tank 21 having an opened top, liquid tight enclosure or vessel 23 (often referred to simply as the "tank") for holding a quantity of oil or the like and for holding the core/coil assembly of the transformer immersed in the oil or the like as will now be apparent to those skilled in the art, and a cover or lid 25 for closing the opened top of the vessel 23.

The vessel 23 may be somewhat box shaped, having a substantially flat, rectangular or square front wall or panel 27 (typically referred to as the transformer front panel or plate 27), a substantially flat, rectangular or square rear wall or panel 29, a pair of substantially flat, rectangular side walls or panels 31 extending between the front and rear plates 27, 29, and a bottom panel 33 will all the various panels joined together to form the opened top, liquid-tight vessel 23. The electrical connectors 19 of the transformer are mounted on the exterior face of the transformer front plate 27 with electrical conductors extending through the transformer front plate 27 between the electrical connectors 19 and the core/coil assembly inside the tank 21 as will now be apparent to those skilled in the art.

The cover 25 is preferably designed to completely cover and close the opened top of the vessel 23. The cover 25 may have a lip 34 around the outer edges thereof. The lip 34 is preferably down-turned around the rear and side edges of the cover 25, and may be up-turned along the front edge of the cover 25. The lip 34 reinforces and structurally strengthens the cover 25, and plays an important role in preventing unauthorized removal of the cover 25 from the vessel 23 as will hereinbelow be explained. Bolts 35, preferably carriage head bolts, extend through the edge of the cover 25 and through a flange 37 in the upper edges of the front, rear and side panels 27, 29, 31. Nuts 39 are preferably used to secure the bolts 35 and fix the cover 25 to the vessel 23. A gasket 41 may be provided between the cover 25 and the flange 37.

The vessel 23 preferably has a reinforced portion at the opened top thereof. The reinforced portion may be formed by a channel, i.e., an outwardly opening, box or U-shaped section or channel 43, extending around at least the upper edges of the rear and side panels 29, 31 of the vessel 23, with the flange 37 forming the upper leg or arm of the channel 43. The channel 43 strengthens the vessel 23 sufficiently and acts as a structural member to allow for the use of thinner material than what has been traditionally used for such transformer tanks with removable covers. The box section or channel 43 also assists in keeping the top flange 37 of the vessel 23 straight, when looking along the length, giving better alignment with the cover 25 (e.g., between the apertures in the cover 25 and the flange 37 for the shaft of the bolts 35) than traditional designs. When used to secure the cover 25 to the vessel 23, the nuts 39 and distal ends of the bolts 35 are located with a cavity 45 formed by the channel 43, and the channel 43 will play an important role in preventing unauthorized removal of the cover 25 from the vessel 23 as will hereinbelow be explained.

The cabinet 11 includes a wiring cabinet or compartment 47, sometimes referred to as the air compartment or cabinet, covering at least a portion of the transformer tank front plate 27 for enclosing the electrical connectors 19 mounted on the exterior face of the transformer front plate 27. The wiring compartment 47 includes a cover or hood 49, a door assembly 51, a first side panel 53, a second side panel 55, first hinge means or structure 57 joining the door assembly 51 and the first side panel 53 together to allow the door assembly 51 to pivot relative to the first side panel 53, second hinge means or structure 59 joining the door assembly 51 and the second side panel 55 together to allow the door assembly 51 to pivot relative to the second side panel 55, third hinge means or structure 61 joining the first side panel 53 and the transformer tank front plate 27 together to allow the first side panel 53 to pivot relative to the transformer tank front plate 27, and fourth hinge means or structure 63 joining the second side panel 55 and the transformer tank front plate 27 together to allow the second side panel 55 to pivot relative to the transformer tank front plate 27. A partition 64 may extend from the transformer front plate 27 into the interior of the wiring compartment 47 to divide the interior of the wiring compartment 47 into high and low voltage areas. The wiring compartment 47 preferably includes fifth hinge means or structure 65 joining the hood 49 and the transformer tank front plate 27 together (via a U-shaped hinge channel 66 which extends across the transformer tank front plate 27 and is secured to the flange 37 of the transformer tank front plate 27 using the bolts 35 and nuts 39 assemblies or formed as part of the front plate 27) to allow the hood 49 to pivot relative to the transformer tank front plate 27. The door assembly 51 preferably includes a first door panel 67 joined to the first side panel 53 by the first hinge means or structure 57 and a second door panel 69 joined to the second side panel 55 by the second hinge means or structure 59.

The first and second hinge structures 57, 59 allow the door assembly 51 (i.e., the first and second door panels 67, 69) to open and close in the typical manner. The third hinge structure 61 allows the first side panel 53, with the first door panel 67 attached thereto, to swing between fully opened and closed positions. The fourth hinge structure 63 allows the second side panel 55, with the second door panel 69 attached thereto, to swing between fully opened and closed positions. The fifth hinge structure 65 allows the hood 49 to open and close in the typical manner.

The overall effect of the hinge structures 57, 59, 61, 63, 65 is to allow the wiring compartment 47 to be opened by authorized personnel to allow the interior of the wiring compartment 47 to be totally exposed on all three sides and the top. This allows utility linemen, etc., to work on the electrical connectors 19 and other wiring within the wiring compartment 47 without any obstructions caused by the compartment 47. The hood 49, side panels 53, 55, hinge structures 57, 59, 61, 63, 65, and door panels 67, 69 are preferably constructed to enable easy removal of the hood 49, either or both door panels 67, 69 only, or either or both door panels 67, 69 and associated side panels 53, 55, etc.

A U-shaped sill 70 preferably sits on the pad 15 and extends from the transformer front plate 27 below the side panels 53, 55 and door panels 67, 69 of the wiring compartment 47. The sill 70 is preferably bolted or otherwise detachably secured to the bottom of the transformer front plate 27. The sill 70 allows the side panels 53, 55 to swing open without scrapping on the pad 15 or the ground, and to function as doors.

The hood 49, side panels 53, 55, hinge structures 57, 59, 61, 63, and door panels 67, 69 of the wiring compartment 47, and the U-shaped sill 70, etc., are preferably designed and constructed so that with the wiring compartment 47 closed, the various parts form tight fits with multiple bends to resist wire entry and meet the tamper requirements outlined in ANSI C57.12.28-1999. A standard locking means 71 including a handle 72 is provided to lock the wiring compartment 47 in the fully closed position. The hood 49 and side panels 53, 55 are preferably designed so that the hood 49 must be raised before the side panels 53, 55 can swing open.

The cabinet 11 preferably includes tamper-proof securing means 73 for preventing or hindering unauthorized removal of the transformer tank cover 25 from the open top of the transformer tank vessel 23. The tamper-proof securing means 73 includes a shield member 75 for blocking unauthorized access to the nuts 39 securing the bolts 35, and thus the cover 25, to the opened top vessel 23. The shield member 75 is designed to fit into or be positioned within the channel 43 of the vessel 23 to block unauthorized access to the nuts 39. The shield member 75 may be U-shaped in cross section (see FIG. 7), and U-shaped in plan, having a back portion 77 extending within the cavity 45 of the channel 43 along the rear panel 29 of the vessel 23 and side members 79 for extending within the cavity 45 of the channel 43 along both side panels 31 of the vessel 23. As will be noted from FIG. 7, depending on the specific design of the channel 43 and shield member 75, the lip 34 of the cover 25 may also play part in limiting access to the nuts 39. The shield member 75 is secured to the transformer enclosure 11 in a manner that access into the interior of the wiring compartment 47 is required to remove the shield member 75. For example, the shield member 75 may be affixed to the transformer front plate 27 by way of weld studs or bolts 81 extending through an end plate 83 on each side portion 79 of the shield member 75 and then through the transformer front plate 27, and hardware or nuts 85 affixed to each bolt 81 within the interior of the wiring compartment 47 (see FIG. 8), which can be removed only after gaining access through the door assembly 51 of the wiring compartment 47, thereby limiting access to the nuts 85 to authorized personnel having a key or code, etc., to the locking means 71.

Construction and operation of the padmount transformer enclosure 11 should now be apparent to those skilled in the art. The vessel 23 of the transformer tank 21 can be constructed as a liquid tight enclosure out of relatively thin sheet metal due to the box or U-shaped reinforcement provided by the channel 43. In addition, due to the strength of the design, some of the traditional tank stiffening, including the need for additional stiffening gussets around the upper section of the tank 21, can be eliminated, especially when used with external cooling fins. Lift lugs 87 may be welded or otherwise fixed to the vessel 23 to allow the transformer enclosure 11 to be easily moved in the typical manner. The hood 49, side panels 53, 55, and door panels 67, 69 of the wiring compartment 47, and the sill 70 are preferably constructed out of sheet metal with multiple bends, etc., at the edges so that when the wiring compartment 47 is closed, the hood 49, side panels 53, 55, and door panels 67, 69, and sill 70 form tight fits with one another to resist wire entry and preclude tampering, etc.

Although the present invention has been described and illustrated with respect to a preferred embodiment and a preferred use therefor, it is not to be so limited since modifications and changes can be made therein which are within the full intended scope of the invention.

What is claimed is:

1. A padmount transformer enclosure for housing a transformer; said transformer enclosure comprising:
   (a) a transformer tank having a transformer tank front plate; and
   (b) a wiring compartment covering at least a portion of said transformer tank front plate; said wiring compartment including a hood, a door assembly separate from said hood, a first side panel separate from said hood and said door assembly, a second side panel separate from said hood and said door assembly, first hinge structure joining said door assembly and said first side panel together to allow said door assembly to pivot relative to said first side panel and said hood, second hinge structure joining said door assembly and said second side panel together to allow said door assembly to pivot relative to said second side panel and said hood, third hinge structure joining said first side panel and said transformer tank front plate together to allow said first side panel to pivot relative to said transformer tank front plate and said hood, fourth hinge structure joining said second side panel and said transformer tank front plate together to allow said second side panel to pivot relative to said transformer tank front plate and said hood, and fifth hinge structure joining said hood and said transformer tank front plate together to allow said hood to pivot relative to said transformer tank front plate, said door assembly, said first side panel, and said second side panel.

2. The padmount transformer enclosure of claim 1 in which said door assembly of said wiring compartment includes a first door panel joined to said first side panel by said first hinge structure and a second door panel joined to said second side panel by said second hinge structure.

3. The padmount transformer enclosure of claim 1 in which said transformer tank includes a transformer tank container having an opened top, in which said transformer tank includes a cover; and in which said padmount transformer enclosure includes tamper-proof securing means for securing said transformer tank cover to said transformer tank container to close said opened top of said transformer tank container.

4. The padmount transformer enclosure of claim 3 in which said transformer tank includes a plurality of bolts extending through said transformer tank cover and said transformer tank container, and a plurality of nuts with one of said nuts attached to each of said bolts; and in which said tamper-proof securing means includes a shield member for blocking access to said nuts.

5. The padmount transformer enclosure of claim 4 in which said transformer tank container has a reinforced portion at said opened top thereof.

6. The padmount transformer enclosure of claim 5 in which said reinforced portion of said transformer tank container is formed by a channel extending around at least a portion of said opened top of said transformer tank container.

7. The padmount transformer enclosure of claim 6 in which said channel is box-shaped.

8. The padmount transformer enclosure of claim 6 in which said channel is U-shaped.

9. A padmount transformer enclosure for housing a transformer; said transformer enclosure comprising:
   (a) a transformer tank having a transformer tank front plate; said transformer tank including a transformer tank container having an opened top, a transformer tank cover, a plurality of bolts extending through said transformer tank cover and said transformer tank container, and a plurality of nuts with one of said nuts attached to each of said bolts; said transformer tank container having a reinforced portion at said opened top thereof formed by a U-shaped channel extending around at least a portion of said opened top of said transformer tank container; said bolts extending through one side of said U-shaped channel, said nuts being located within said U-shaped channel;

(b) a wiring compartment covering at least a portion of said transformer tank front plate; said wiring compartment including a hood, a door assembly, a first side panel, a second side panel, first hinge structure joining said door assembly and said first side panel together to allow said door assembly to pivot relative to said first side panel, second hinge structure joining said door assembly and said second side panel together to allow said door assembly to pivot relative to said second side panel, third hinge structure joining said first side panel and said transformer tank front plate together to allow said first side panel to pivot relative to said transformer tank front plate, and fourth hinge structure joining said second side panel and said transformer tank front plate together to allow said second side panel to pivot relative to said transformer tank front plate; and (c) tamper-proof securing means for securing said transformer tank cover to said transformer tank container to close said opened top of said transformer tank container; said tamper-proof securing means including a shield member for blocking access to said nuts of said transformer tank; said shield member being positioned within said U-shaped channel of said transformer tank to restrict access to said nuts of said transformer tank.

10. A padmount transformer enclosure for housing a transformer; said transformer enclosure comprising:

(a) a transformer tank including a transformer tank cover, a transformer tank container having an opened top, a plurality of bolts extending through said transformer tank cover and said transformer tank container, and a plurality of nuts with one of said nuts attached to each of said bolts to secure said transformer tank cover to said transformer tank container and to close said opened top of said transformer tank container; said transformer tank container having a reinforced portion at said opened top thereof formed by a U-shaped channel extending around at least a portion of said opened top of said transformer tank container; said bolts extending through one side of said U-shaped channel, said nuts being located within said U-shaped channel;

(b) tamper-proof securing means for preventing unauthorized removal of said transformer tank cover from said transformer tank container; said tamper-proof securing means including a shield member for blocking access to said nuts; said shield member being positioned within said U-shaped channel to restrict access to said nuts; and (c) a wiring compartment covering at least a portion of said transformer tank front plate.

11. The padmount transformer enclosure of claim 10 in which said wiring compartment includes a hood, a door assembly, a first side panel, a second side panel, first hinge structure joining said door assembly and said first side panel together to allow said door assembly to pivot relative to said first side panel, second hinge structure joining said door assembly and said second side panel together to allow said door assembly to pivot relative to said second side panel, third hinge structure joining said first side panel and said transformer tank front plate together to allow said first side panel to pivot relative to said transformer tank front plate, and fourth hinge structure joining said second side panel and said transformer tank front plate together to allow said second side panel to pivot relative to said transformer tank front plate.

12. The padmount transformer enclosure of claim 11 in which said wiring compartment includes fifth hinge structure joining said hood and said transformer tank front plate together to allow said hood to pivot relative to said transformer tank front plate.

13. The padmount transformer enclosure of claim 11 in which said door assembly of said wiring compartment includes a first door panel joined to said first side panel by said first hinge structure and a second door panel joined to said second side panel by said hinge structure.

14. The improvement of claim 13 in which said first and second side panels are removable from said transformer tank.

15. An improved padmount transformer enclosure including a transformer tank having a front plate, and a wiring compartment having an outer cover member for covering said front plate of said transformer tank; said cover member including a first side panel extending from said transformer tank, a second side panel extending from said transformer tank, a door assembly attached to said first and second side panels by door hinges, a hood extending from said transformer tank, and a hood hinge attaching said hood to said transformer tank for allowing said hood to be moved between closed and raised positions, wherein the improvement comprises: a first side panel hinge attaching said first side panel to said transformer tank for allowing said first side panel to be moved between closed and opened positions; and a second side panel hinge attaching said second side panel to said transformer tank for allowing said second side panel to be moved between closed and opened positions; said cover member being designed to allow said first and second side panels to move between closed and opened positions only when said hood is in said raised position.

* * * * *